United States Patent [19]

Fuller

[11] 4,219,907
[45] Sep. 2, 1980

[54] TREATMENT OF FISH

[75] Inventor: Derek E. Fuller, Kingston, England

[73] Assignee: St. Clair Fisheries, Aberdeen, Scotland

[21] Appl. No.: 924,816

[22] Filed: Jul. 14, 1978

Related U.S. Application Data

[62] Division of Ser. No. 910,341, May 30, 1978.

[30] Foreign Application Priority Data

Jun. 2, 1977 [GB] United Kingdom ............... 23347/77

[51] Int. Cl.³ ..................... A22C 17/04; A22C 17/00
[52] U.S. Cl. ........................................ 17/46; 17/1 G; 17/56

[58] Field of Search ............ 17/1 G, 46, 56, 45

[56] References Cited

U.S. PATENT DOCUMENTS

| 2,787,549 | 4/1957 | Heald | 17/1 G |
| 2,851,362 | 9/1958 | Goldberg | 17/1 G X |

Primary Examiner—Willie G. Abercrombie
Attorney, Agent, or Firm—Larson, Taylor and Hinds

[57] ABSTRACT

Method of and apparatus for recovering flesh from already filleted fish skeletons wherein before stripping the flesh from the bone by jets of water or air the flesh-bone bond is weakened by heat and by a mechanical treatment using e.g. pommelling heads.

9 Claims, 6 Drawing Figures

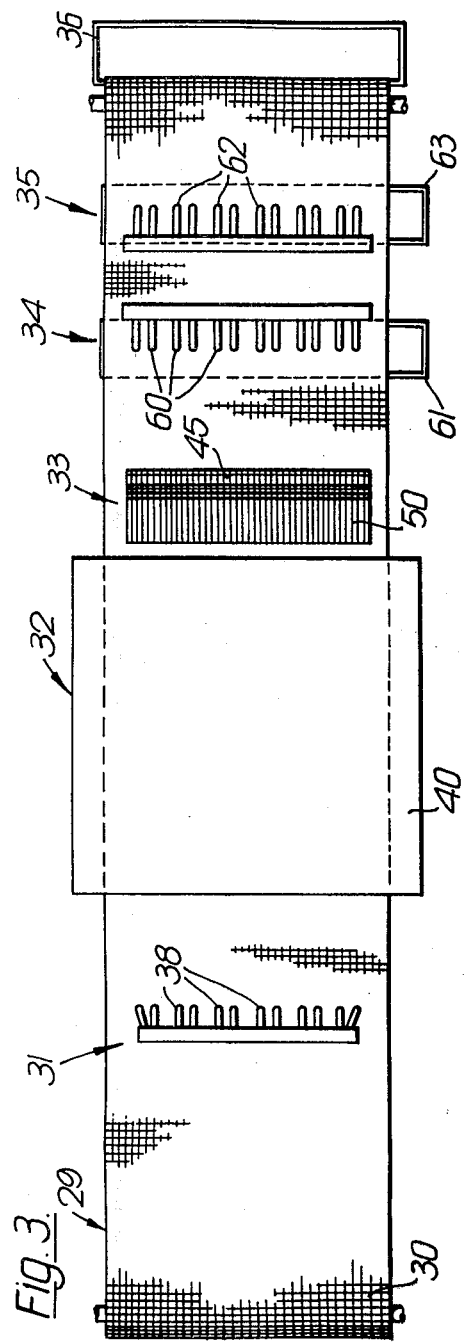
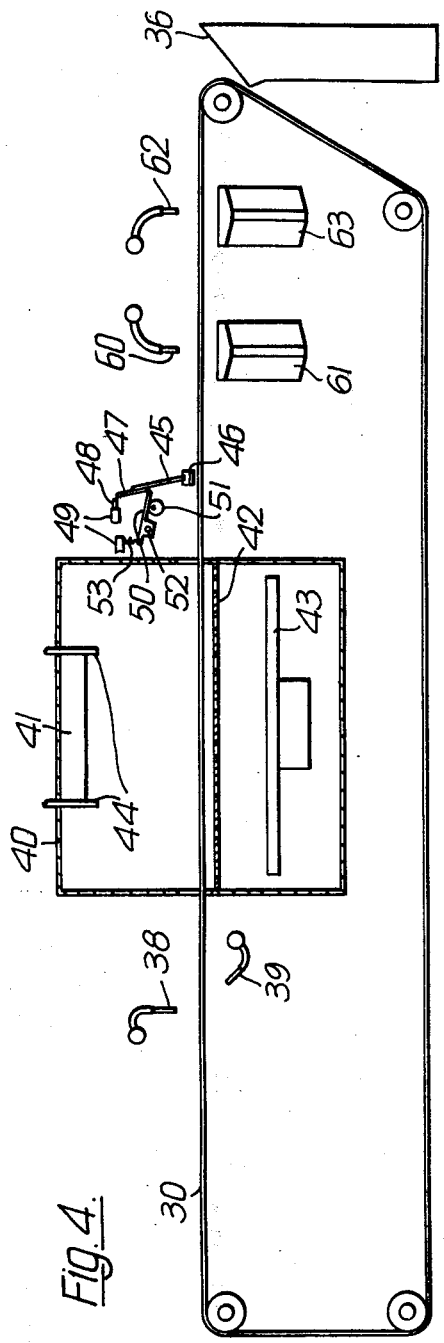
Fig. 3.
Fig. 4.

TREATMENT OF FISH

This is a division of co-pending application Ser. No. 910,341, filed May 30, 1978.

TECHNICAL FIELD

This invention relates to the treatment of fish and in particular to a method and apparatus for the recovery of flesh from fish skeletons which have already been subjected to a filleting operation.

The invention is applicable to round fish skeletons such as cod, haddock and coley and also to flat fish skeletons such as plaice and sole.

BACKGROUND ART

Traditionally, flesh for human consumption is recovered from fish by a filleting process whereby a fillet is cut from each side of the fish skeleton. Formerly, hand filleting methods were used exclusively for this operation, but latterly mechanical filleting units have been developed to perform this task and are now used extensively alongside manual methods.

Considerable attention has been paid to the achievement of higher filleting yields, i.e. that percentage of the whole fish recovered as fillet, particularly during the last four years during which there has been a diminution in the supply, and an escalation in the price, of traditional species such as cod and haddock. Some success by detailed re-design and adjustment of machine filleting systems has resulted in fillet yields being pushed up to figures generally around the 50% mark.

Large quantities of edible flesh still remain, particularly on the skeletons of fish, even after filleting at high yield. This flesh lies mainly between the ray bones which extend from the spinal chord and around the belly cavity where it cannot be reached by the filleting knives.

Flesh recovery from fish skeletons is currently centred around the use of mechanical separators, where for example separation of flesh from bone is effected by subjecting the skeleton to a high pressure between a perforated drum and a rubber belt. Flesh is squeezed from between and around the bones, passes through the perforations and is recovered. Bones, fin and cartilage thus separated from the flesh are rejected to waste.

The use of high pressure methods for flesh separation, although giving a good percentage of flesh recovery, suffers from certain disadvantages. Firstly, the physical size of materials which can be fed to the separators has to be limited, particularly if the skeleton contains bones of substantial size, otherwise mechanical damage to the separators can occur. Secondly, and of prime importance from a product point of view, the pressure exerted in the separator tends to express blood, membrane and nerve fibre (if present) along with the recovered flesh, thus lowering its quality and restricting its market outlets. The main concentration of these undesirable components is along the spinal column and in the belly cavity region of fish skeletons. Consequently machines have been developed to trim out these regions, leaving skeleton trimmings which can be separated into flesh and bone as described above. The trimming action of these machines is rarely entirely accurate because of the nature of the material being handled, so that either an excessive amount of flesh is lost along with those parts trimmed out to waste, or parts of the waste material remain attached to the trimmings and contaminate the final product.

Further experiments into flesh recovery techniques have now resulted in a method by which a high yield of flesh can be recovered from fish skeletons without the necessity to trim out the backbone and belly cavity regions whilst at the same time substantially reducing contamination from blood, membrane and nerve fibre.

DISCLOSURE OF INVENTION

According to one aspect of the invention, a method for the recovery from filleted fish skeletons of flesh at least substantially free of fin, blood vessels, membrane, and nerve fibre comprises the steps of:

(a) washing a fish skeleton from a filleting operation;

(b) heating the washed skeleton to weaken the bond between said flesh and the skeleton bone;

(c) pommelling the heated flesh to further weaken the bond between bone and flesh; and (d) impinging a jet of fluid onto the pommelled skeleton to strip flesh from the bone whilst leaving fin, blood vessels, membranes, and nerve fibre substantially intact and still attached to the bone.

According to another aspect of the invention, apparatus for the recovery from filleted fish skeletons of flesh at least substantially free of fin, blood vessels, membrane and nerve fibre comprises a washing section comprising means for washing filleted fish skeletons, a heating section comprising means for heating the washed fish skeletons to weaken the bond between said flesh and the skeleton bone;

a pommelling section comprising means for pommelling the heated skeleton to further weaken the bond between bone and flesh; and a flesh stripping section comprising means for impinging a jet of fluid onto the pommelled skeleton to strip flesh from the bone whilst leaving fin, blood vessels, membranes, and nerve fibre substantially intact and still attached the bone.

BRIEF DESCRIPTION OF DRAWINGS

By way of example the invention will now be described with reference to the accompanying diagrammatic drawings of which, FIGS. 3 and 4 are respectively a plan and longitudinal section of a second flesh recovery apparatus.

Figure 1:
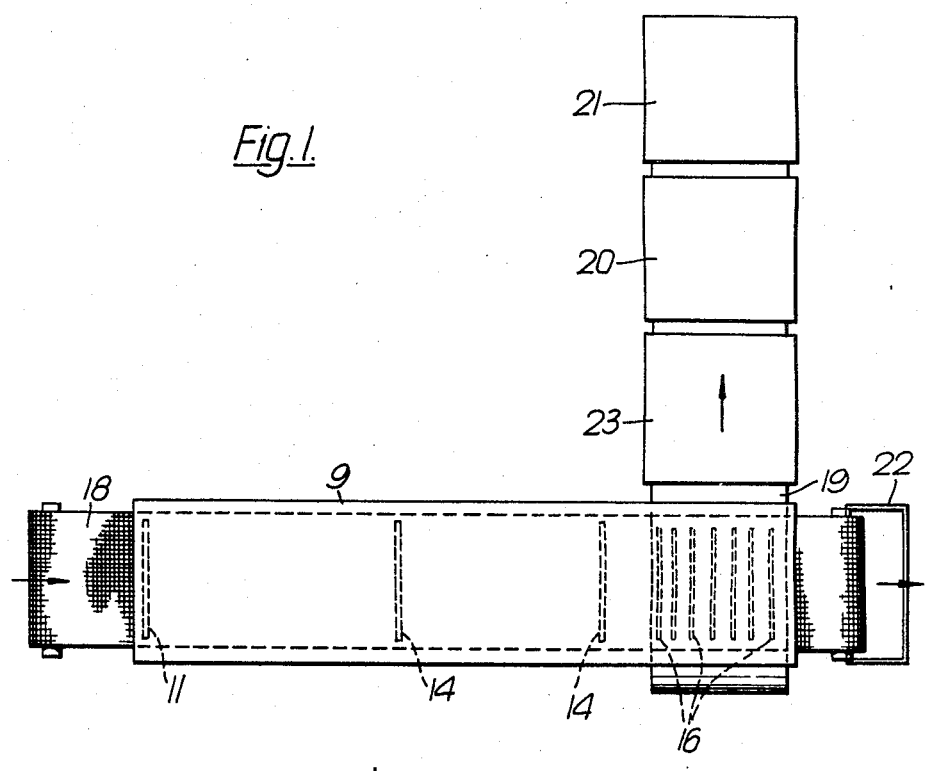
FIGS. 1 and 2 are respectively a plan and longitudinal section of a first flesh recovery apparatus.

A horizontal tunnel 9 comprises a washing station 10 provided with a transverse row of downward-facing fresh water sprayers 11, followed by a drying or draining station 12, a heating station 13 provided with upward-facing steam injectors 14, and finally a spraying station 15 provided with transverse rows of downward-facing fresh water nozzles 16. An endless conveyor 18 having an interrupted surface, e.g. of mesh construction, moves through the tunnel to convey through the stations in turn filleted fish skeletons arranged in parallel lines on the upper pass of the conveyor. An endless belt conveyor 19 beneath the station 15 passes underneath the upper pass of the mesh conveyor 18 at right angles to it and leads firstly to a screw press 23, and then to a carbon dioxide chilling unit 20 followed by a bone separator unit 21. The screw press 23 and units 20, 21 may be of any known kind. A bone collector 22 is located at the discharge end of the conveyor 18. The apparatus may be operated as follows.

Figure 2:
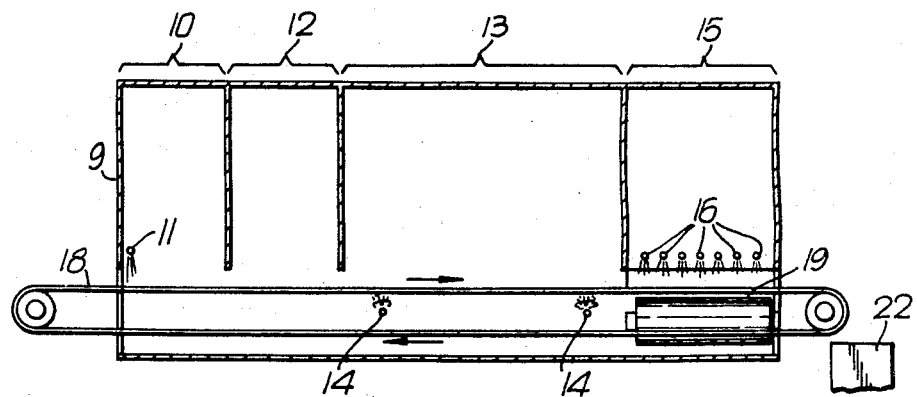
Figure 5:
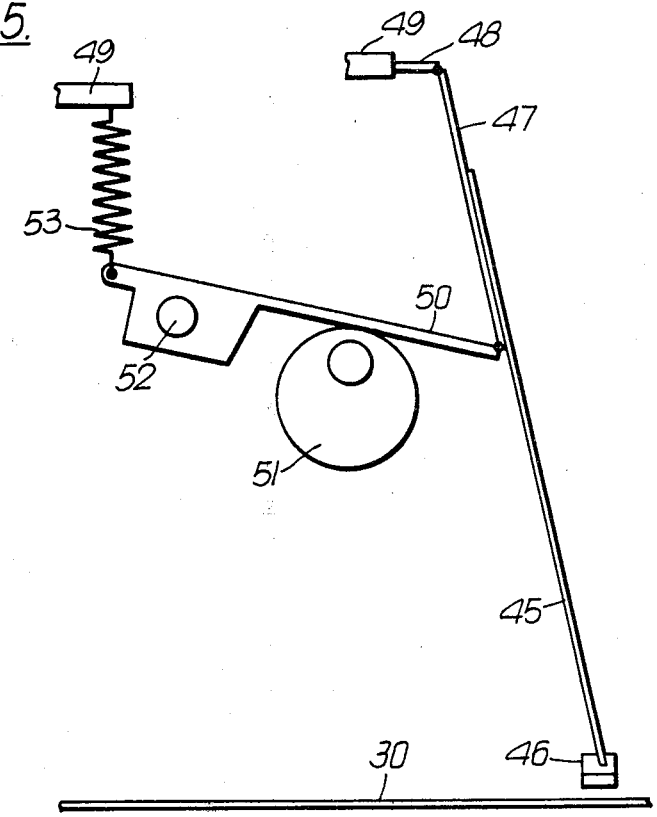
FIGS. 5 and 6 are detail views on a larger scale of a multi-rod device forming part of the second apparatus, FIG. 5 being a side view illustrating support and operating features and FIG. 6 being a view of the bottom portion of the device as seen from a fish skeleton reaching the device.

Steam is injected to heat the station 13 to about 80° C., fresh water is supplied to the sprayers 11 and nozzles 16, the conveyors 18, 19 are started and filleted fish skeletons are loaded on to the upstream end of the conveyor 18 at the left hand of FIGS. 1 and 2. As the fish skeletons pass through the washing station 10 on the conveyor 18, the water from the sprayers 11 washes the fish flesh to remove external contamination such as blood clots, scales and slime. The washed skeletons then pass through the station 12 where surface water is allowed to drain downwards from the skeletons through the holes of the conveyor 18. As the skeletons pass through the heating station 13 their flesh is heated by the steam to 40°-75° C. or possibly a little higher in order to weaken the bond between flesh and bone. The conveyor speed is adjusted or interrupted to provide a residence time in the heating station 15 which ensures as far as possible that the flesh temperature at the bone-flesh inter-face is raised to the appropriate temperature for the species of fish and for any acceptable degree of contamination of the subsequent stripped flesh by fin, membrane, blood or blood vessels. The degree of humidity in station 13 will also affect the residence time. Typically the flesh temperature is about 60°-70° C. and the residence time is 1-2 minutes. If the station temperature is lowered, the skeleton residence time must be correspondingly increased to provide the required flesh temperature. If the flesh temperature is raised too much, blood may be released into the flesh which is undesirable.

With the flesh-bone bond now weakened, the still hot skeletons with their partly cooked flesh pass through the spraying station 15 where they are subjected to downward jets of water from the nozzles 16 which strip the flesh from the skeletons but leave the blood vessels, membrane and nerve fibre substantially intact and attached to the skeleton bone. The resulting small portions of stripped flesh pass downwards through the holes in the conveyor 18 and on to the conveyor 19. The larger skeleton bone passes onwards on the conveyor 18 to be discharged into the collector 22. From the conveyor 19 the flesh portions pass through the screw press 23 to remove surface water, and the portions are then conveyed to the unit 20 where they are chilled to a temperature of about 0° C.

From the chilling unit 20 the flesh portions are conveyed to the separator unit 21 for the removal of any small quantities of bone or fin which may have been extracted with the flesh portions in station 15. Finally the flesh portions are collected from the separator 21 to be stored under chill conditions prior to use in products for human consumption.

BEST MODE FOR CARRYING OUT THE INVENTION

Referring to the second apparatus shown in FIGS. 3–6 an endless conveyor of open construction 30, e.g. of wire mesh, has its upper pass arranged to pass through a washing section 31, a heating section 32, a mechanical treatment section 33, a first stripping section 34 and a second stripping section 35. A skeleton or bone collector 36 is located at the downstream end of the upper pass. The surface of the conveyor is conveniently marked into parallel lanes. The loading area is indicated by reference numeral 29.

The washing section 31 is provided with a transverse row of downward-facing water nozzles 38 supported above the conveyor and with a transverse row of water nozzles 39 supported below the upper pass of the conveyor, the nozzles 39 facing upwards and being inclined against the direction of motion of the conveyor. The function of the water jets issuing from the nozzles 38, 39 is to wash the fish skeletons on the conveyor to remove external contamination such as blood clots, scales and slime.

The heating section 32 comprises a substantially closed chamber 40 through which the upper pass of the conveyor is arranged to travel. The upper portion of the heating chamber houses an electric air heater 41 and a pair of atomising nozzles 44 arranged to discharge atomised water, the lower portion of the heating chamber below the upper pass houses an interceptor plate 42 and below that a tray 43 provided with an electric heater in a well for heating water supplied to the tray. The plate 42 intercepts bits of fish skeleton which may fall through the conveyor mesh during its travel through the chamber 40 and so prevents them from entering the water tray 43. The plate 42 is perforated, or of fine mesh construction, to allow the hot humid air resulting from the heating of the tray water to pass upwards through the conveyor mesh and heat the fish skeletons in the chamber. By way of example, when treating cod skeletons the air inside the chamber 40 is heated to 65°-75° C. and the residence time for the skeletons in the chamber is 3-4.5 minutes. This provides a general flesh temperature which is a little lower than the chamber air temperature. It will be appreciated that the flesh temperature is not completely uniform but would depend on where exactly the temperature is measured. What is important is to ensure that the temperature where the flesh is bonded to the bone is sufficient to weaken that bond. On the other hand if the flesh temperature is allowed to become too high, the flesh will become contaminated by fin, membrane or blood to a degree which is not acceptable in an end product for human consumption.

To provide sufficient residence time in the heating chamber 40 the conveyor 30 may be stopped for each batch of fish skeletons or alternatively made to travel slowly, but either mode of operation would slow down production. If however the chamber 40 was made sufficiently long to avoid reducing production it would greatly increase the length of the apparatus and would require correspondingly more heating. A preferred solution is to employ a heating chamber which provides an extended travelling path for the fish skeletons. Such a path may involve a rising section and a lowering section, with transfer mechanisms for transferring the skeletons from a modified conveyor to the rising section, from the latter to the lowering section, and from the lowering section back to the modified conveyor. An example of a generally suitable chamber is disclosed in U.S. Pat. No. 3,993,189, although some modification to a heating chamber would be required and hot humid air or steam would be used to heat the skeletons in the chamber.

The mechanical treatment section 33 comprises a transverse row of downwardly-inclined rods 45 which are provided at their bottom ends with pommelling heads 46 which are compatible with food, and are yielding and resilient. The heads may be in the form of silicone rubber tips. The upper portion of each rod 45 overlaps and is detachably secured to an arm 47 of a three-arm hingeable support device. The arm 47 is hinged to a short second arm 48 which is anchored to a part 49 of a main support frame. The third arm 50 which is hinged at one end to the arm 47 extends across the top of an eccentric cam 51 and is mounted on a horizontal pivot pin 52. The end of the arm 50 adjacent the pivot pin 52 is connected by a tension spring 53 to another part 49 of the above mentioned main support frame. When the cam 51 is rotated it causes the arm 50 to pivot up and down about the pivot pin 52, the arm 47 to move upwards and downwards, and the rod 45 to be repeatedly lifted and depressed. The spring 53 acts to urge the rod 45 downwards. As a result the pommelling head 46 may repeatedly pommel or pound any fish skeleton lying on the conveyor 30 below it so as to produce a further weakening of the bond between bone and flesh upstream of the stripping sections 34, 35. However, the fins should not be pommelled in case it weakens them and leads subsequently to fin contamination of the flesh removed in the stripping step.

Figure 6:
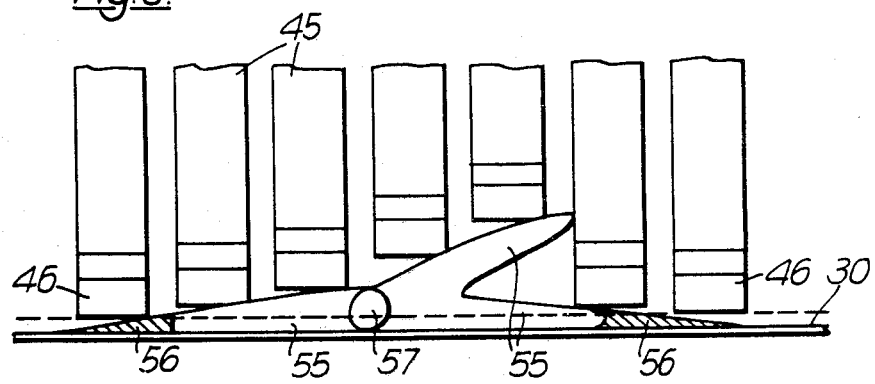

The flesh 55 as shown in FIG. 6 projects upwards to a more or less greater extent than the fins 56 lying to either side of the skeleton backbone 57. Accordingly adjustment is made to the rod supporting mechanism to vary as required the minimum vertical operational spacing of each pommelling head 46 above the conveyor 30 so as to ensure as far as is practicable that the flesh 55 but not the fins 56 is pommelled.

Such adjustment may be made in the following manner. Assuming that each frame part 49 to which an arm 48 is anchored is made adjustable in height on the main support frame, then by adjustment of said height the associated pommelling head 46 can be controlled to ensure that in operation it will pommel flesh but not fin. A possible alternative method of adjustment would be to make variable the amount of overlap of the arm 47 by the rod 45, e.g. by an adjustable clamp.

This further weakening of the bond between the bone and the flesh has the advantage that the flesh stripping by water jets in the next step can be modified by a reduction in the water pressure which in turn reduces the possibility or amount of fin, blood and membrane contamination of the stripped flesh.

The operating mechanism in section 33 which is preferably of plastics material is designed to minimize any debris traps which could produce likely bacteria breeding grounds and thus health hazards.

The first stripping section 34 is provided with a row of transversely spaced pairs of side-by-side downward-facing water nozzles 60, one pair to each lane of the conveyor. Below the upper pass of the conveyor is located a transversely extending inclined chute 61 to receive the flesh stripped from the skeletons by the water jets from the nozzles 60. The chute 61 discharges into a collector.

The second stripping section 35 is provided with an arrangement of water nozzles 62, chute 63 and collector similar to that of section 34. However, as is shown by the table below, the section 34 is a low pressure stripping section whilst the section 35 is a high pressure stripping section.

| Section | Type of nozzle | Nozzle pressure | flow rate | Nozzle spacing from conveyor |
| --- | --- | --- | --- | --- |
| 34 | 80° fan angle Vee jet. | 35 lbf/in$^2$ | 0.50 galls per minute | 90 mm |
| 35 | 80° fan angle Vee jet. | 40 lbf/in$^2$ | 0.75 galls per minute | 90 mm |

In operation, filleted fish skeletons are loaded onto the area 29 of the conveyor 30 and arranged to lie in a single layer in the parallel lanes, either head or tail first. The conveyor carries the skeletons through the washing section 31 and then into the heating or first bond weakening section 32. After the appropriate residence time in the chamber 40 the conveyor carries the heated skeletons through the mechanical treatment or further bond weakening section 33. What happens next depends on whether the final objective is flesh with no or minimal contamination or a maximum amount of flesh but with an acceptable level of contamination. If the former is required, the conveyor carries the skeletons through an operative low pressure stripping section 34 and an inoperative high pressure stripping section 35. The stripped flesh is collected by the chute 61 whilst the skeleton bone is carried onwards by the conveyor to be discharged into the end collector 36. If however the objective is a maximum amount of flesh, the conveyor carries the skeletons through the stripping sections 34, 35 which are both operating, the stripped flesh being collected by both chutes 61, 63.

In a modification of the apparatus, the water jet stripping section 15 or sections 34, 35 is or are replaced by an air jet stripping section or sections. The use of air jets has the advantage that it does not wet the skeletons but on the other hand it creates a whirling cloud of stripped flesh and possibly fin which makes their collection difficult. The use of water jets has the advantage that it tends to dampen down the stripped flesh and fin and make their collection correspondingly easier. If cold water is used, it will reduce the flesh temperature and may avoid a possible subsequent cooling stage for the flesh.

The mechanism of the mechanical treatment section 33 may be replaced by any other suitable mechanism provided it avoids as far as possible creating conditions in which it encourages subsequent contamination of the stripped flesh.

What we claim is:

1. A method for the recovery from filleted fish skeletons of flesh at least substantially free of fin, blood vessels, membrane, and nerve fibre comprising the steps of:
    (a) washing a fish skeleton from a filleting operation;
    (b) heating the washed skeleton to weaken the bond between said flesh and the skeleton bone;
    (c) pommelling the heated flesh to further weaken the bond between bone and flesh; and
    (d) impinging a jet of fluid onto the washed and heated skeleton to strip flesh from the bone whilst leaving fin, blood vessels, membrane, and nerve fibre substantially intact and still attached to the bone.

2. A method according to claim 1 wherein said fluid comprises cold water.

3. A method according to claim 1, wherein, in step (b), the temperature of the flesh is raised to lie in the range of 40° to about 75° C.

4. Apparatus for the recovery from filleted fish skeletons of flesh at least substantially free of fin, blood vessels, membrane and nerve fibre comprising:
- a washing section comprising means for washing filleted fish skeletons;
- a heating section comprising means for heating the washed fish skeletons to weaken the bond between said flesh and the skeleton bone;
- a pommelling section comprising means for pommelling the heated skeleton to further weaken the bond between bone and flesh; and
- a flesh stripping section comprising means for impinging a jet of fluid onto the washed and heated skeleton to strip flesh from the bone whilst leaving fin, blood vessels, membranes, and nerve fibre subarstantially intact and still attached to the bone.

5. Apparatus according to claim 4, further comprising conveyor means of open construction for supporting fish skeletons placed thereon and for conveying them through the washing, heating, pommelling and stripping sections, and wherein the pommelling section comprises a plurality of pommelling heads supported above the conveyor means and arranged to pommel the flesh of fish skeletons passing beneath them.

6. Apparatus according to claim 5, further comprising means for adjusting the pommelling heads at least to minimise any pommelling of fin.

7. Apparatus according to claim 5, wherein the pommelling heads are of yielding and resilient character.

8. Apparatus according to claim 5 and in which the conveyor means is arranged to convey a plurality of lanes of fish skeletons through the washing, heating, pommelling and flesh stripping sections, and wherein the pommelling section comprises a row of pommelling heads extending across the lanes, said pommelling section further comprising means for supporting the pommelling heads above the lanes, and actuator means arranged to move the pommelling heads up and down to pommel lanes of fish skeletons passing beneath them on the conveyor means.

9. Apparatus according to claim 5, further comprising means for adjusting the pommelling heads at least to minimise any pommelling of fin.

* * * * *